(12) United States Patent
Nishi et al.

(10) Patent No.: US 11,807,243 B2
(45) Date of Patent: *Nov. 7, 2023

(54) ROAD SURFACE FRICTION BASED PREDICTIVE DRIVING FOR COMPUTER ASSISTED OR AUTONOMOUS DRIVING VEHICLES

(71) Applicant: Intel Corporation, Santa Clara, CA (US)

(72) Inventors: Yoshifumi Nishi, Beaverton, OR (US); David Pidwerbecki, Hillsboro, OR (US); David Browning, Portland, OR (US); Mark Angus MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,244

(22) Filed: Jan. 6, 2022

(65) Prior Publication Data
US 2022/0126835 A1    Apr. 28, 2022

Related U.S. Application Data

(63) Continuation of application No. 16/802,140, filed on Feb. 26, 2020, now Pat. No. 11,267,475, which is a
(Continued)

(51) Int. Cl.
*B60W 40/06* (2012.01)
*G08G 1/01* (2006.01)
(Continued)

(52) U.S. Cl.
CPC ......... *B60W 40/068* (2013.01); *G05D 1/0088* (2013.01); *G07C 5/008* (2013.01);
(Continued)

(58) Field of Classification Search
CPC ......... B60W 2552/40; B60W 2556/45; B60W 2556/50; B60W 2756/10; B60W 40/068;
(Continued)

(56) References Cited

U.S. PATENT DOCUMENTS 8,965,691 B1   2/2015  Lombrozo
9,776,657 B1   10/2017 Badiru et al.
(Continued)

OTHER PUBLICATIONS

Office Action dated Apr. 15, 2019 for U.S. Appl. No. 15/847,591, 16 pages.
(Continued)

*Primary Examiner* — Tyler J Lee
(74) *Attorney, Agent, or Firm* — Schwegman Lundberg & Woessner, P.A

(57) ABSTRACT

Embodiments include apparatuses, methods, and systems for computer assisted or autonomous driving (CA/AD). An apparatus for CA/AD may include a sensor interface, a communication interface, and a driving strategy unit. The sensor interface may receive sensor data indicative of friction between a road surface of a current location of a CA/AD vehicle and one or more surfaces of one or more tires of the CA/AD vehicle. The communication interface may receive, from an external road surface condition data source, data indicative of friction for a surface of a road section ahead of the current location of the CA/AD vehicle. The driving strategy unit may determine, based at least in part on the sensor data and the data received from the external road surface condition data source, a driving strategy for the CA/AD vehicle beyond the current location of the CA/AD vehicle. Other embodiments may also be described and claimed.

31 Claims, 7 Drawing Sheets

Related U.S. Application Data continuation of application No. 15/847,591, filed on Dec. 19, 2017, now Pat. No. 10,576,986.

(51) Int. Cl.
| | |
|---|---|
| *G05D 1/00* | (2006.01) |
| *G08G 1/09* | (2006.01) |
| *G07C 5/00* | (2006.01) |
| *B60W 40/068* | (2012.01) |
| *G08G 1/0967* | (2006.01) |
| *G07C 5/08* | (2006.01) |

(52) U.S. Cl.
CPC .......... *G07C 5/0808* (2013.01); *G08G 1/0112* (2013.01); *G08G 1/096725* (2013.01); *G08G 1/096775* (2013.01); *B60W 2552/40* (2020.02); *B60W 2556/45* (2020.02); *B60W 2556/50* (2020.02); *B60W 2756/10* (2020.02); *G05D 2201/0213* (2013.01)

(58) Field of Classification Search
CPC ............ B60W 50/0097; G05D 1/0088; G05D 2201/0213; G07C 5/008; G07C 5/0808; G08G 1/0112; G08G 1/0116; G08G 1/0129; G08G 1/0133; G08G 1/0141; G08G 1/096725; G08G 1/096741; G08G 1/09675; G08G 1/096775; G08G 1/096783
See application file for complete search history.

(56) References Cited

U.S. PATENT DOCUMENTS

| | | |
|---|---|---|
| 10,106,160 B2 | 10/2018 | Nilsson et al. |
| 2007/0276600 A1 | 11/2007 | King et al. |
| 2011/0298603 A1 | 12/2011 | King et al. |
| 2016/0189544 A1 | 6/2016 | Ricci |
| 2016/0200317 A1 | 7/2016 | Danzl et al. |
| 2017/0101095 A1 | 4/2017 | Nilsson et al. |
| 2017/0365165 A1 | 12/2017 | Landfors et al. |
| 2018/0025630 A1 | 1/2018 | Matsumoto et al. |
| 2018/0061230 A1 | 3/2018 | Madigan et al. |
| 2018/0105181 A1 | 4/2018 | Skold et al. |
| 2018/0130349 A1 | 5/2018 | Du et al. |
| 2018/0196443 A1 | 7/2018 | Bai et al. |
| 2018/0210088 A1 | 7/2018 | Okada |
| 2018/0247067 A1 | 8/2018 | Hrabak et al. |
| 2019/0049256 A1 | 2/2019 | Camp et al. |
| 2019/0051172 A1 | 2/2019 | Stenneth et al. |

OTHER PUBLICATIONS

Final Office Action dated Aug. 12, 2019 for U.S. Appl. No. 15/847,591, 14 pages.

Office Action dated Mar. 22, 2021 for U.S. Appl. No. 16/802,140, 20 pages.

Final Office Action dated Jul. 15, 2021 for U.S. Appl. No. 16/802,140, 13 pages.

ROAD SURFACE FRICTION BASED PREDICTIVE DRIVING FOR COMPUTER ASSISTED OR AUTONOMOUS DRIVING VEHICLES

CROSS REFERENCE TO RELATED APPLICATIONS

The present application is a continuation of U.S. application Ser. No. 16/802,140 filed on Feb. 26, 2020, which is a continuation of U.S. application Ser. No. 15/847,591 filed on Dec. 19, 2017, now U.S. Pat. No. 10,576,986, the contents of each of which are hereby incorporated by reference in their entireties.

FIELD

Embodiments of the present disclosure relate generally to the technical fields of vehicles, and more particularly to computer assisted or autonomous driving vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Road driving condition may change frequently due to natural and unnatural causes, which may post challenges for computer assisted or autonomous driving (CA/AD) vehicles. Existing electronic stability programs (ESP) may cope with the changes to a certain degree by continuously adjust braking to compensate for slippery road conditions. However, due to its passive nature, ESP techniques may not be able to handle abrupt changes in road driving conditions. In such situations, a CA/AD vehicle may have to slow down rapidly, stop, or lose control, hence reducing the efficiency and increasing the risk for the CA/AD vehicle. Also, current techniques tend to be limited in employment of sensor data collected for the current location of the vehicle, and generally limited to handling weather based driving condition changes, e.g., ice in a shadow.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
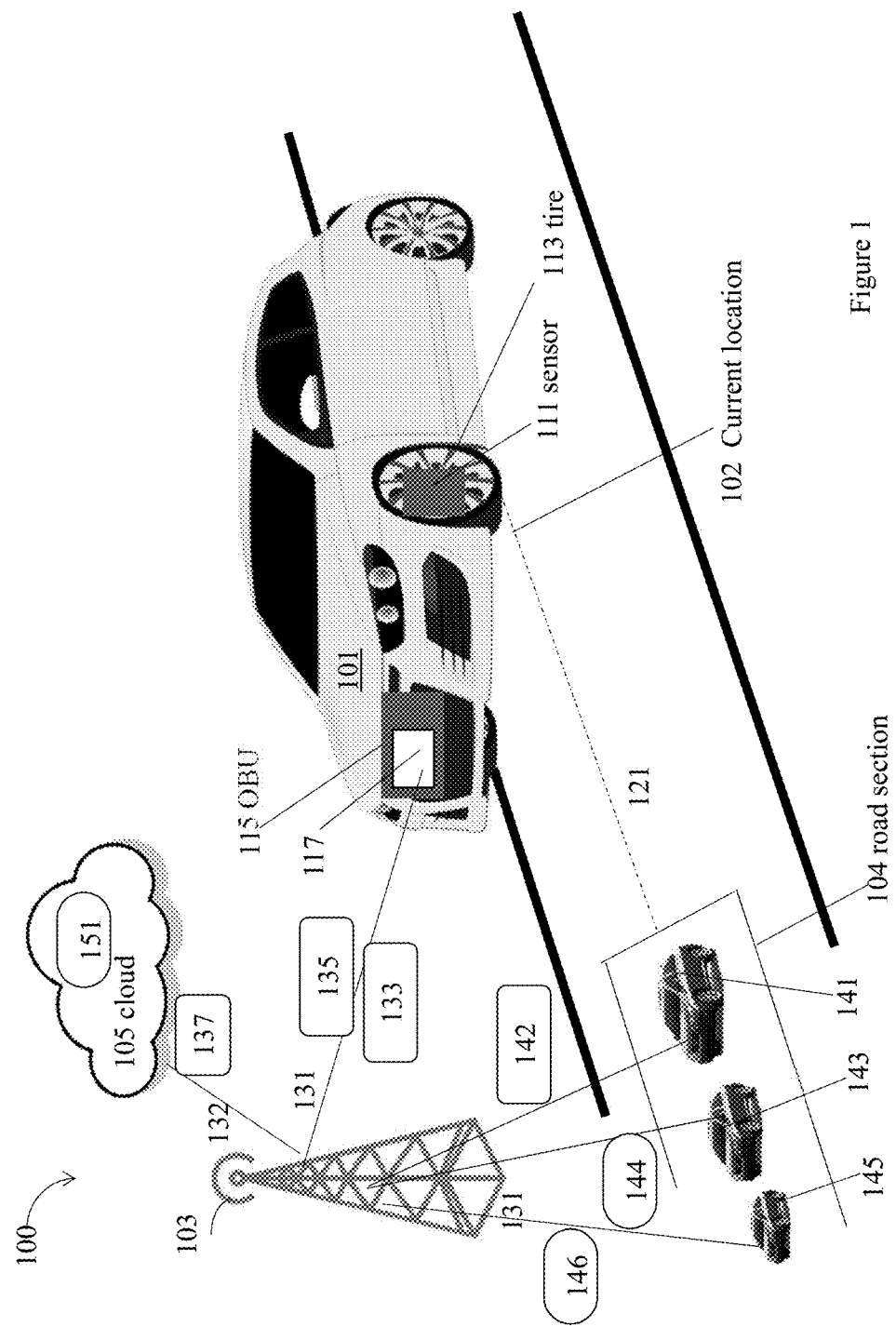
FIG. 1 illustrates an example environment for a computer assisted or autonomous driving (CA/AD) vehicle to communicate with an external road surface condition data source for data indicative of friction for a surface of a road section ahead of a current location of the CA/AD vehicle, in accordance with various embodiments.

Road driving conditions may change frequently or abruptly due to natural and unnatural causes. Current techniques for a computer assisted or autonomous driving (CA/AD) vehicle may have limited ability to handle such changing road driving conditions. For examples, data from LiDAR or other sensors integrated on a CA/AD vehicle may be limited to a current location of the vehicle. Weather information may be limited to a large area with insufficient local information about the road driving conditions. It may be difficult to handle abrupt road driving condition changes, e.g., ice in a shadow, standing water, oil spill, sands, or other road condition changes.

When road driving condition changes, friction between a road surface of a current location of a CA/AD vehicle and one or more surfaces of one or more tires of the CA/AD vehicle may change as well. For example, ice in a shadow or oil spill on a road surface may cause reduced friction between the road surface and one or more surfaces of one or more tires of a CA/AD vehicle. Embodiments herein may present techniques for road surface friction based predictive driving for a CA/AD vehicle to develop a driving strategy for a road section beyond a current location of the CA/AD vehicle, to avoid the need for abrupt driving strategy changes.

In embodiments, an external road surface condition data source may collect data about friction between a road surface and one or more surfaces of one or more tires of a CA/AD vehicle experienced by multiple vehicles over a period of time at various locations within the road section. The external road surface condition data source may process the collected data and generate data indicative of the friction for the surface of the road section, and may communicate such generated data to a CA/AD vehicle before the CA/AD vehicle reaches the road section. A CA/AD vehicle may receive from an external road surface condition data source, data indicative of friction for a surface of a road section ahead of the current location of the CA/AD vehicle. The CA/AD vehicle may determine a driving strategy for the CA/AD vehicle beyond the current location of the CA/AD vehicle based at least in part on the data received from the external road surface condition data source.

In embodiments, an apparatus for CA/AD may include a sensor interface, a communication interface, and a driving strategy unit coupled to the sensor interface and the communication interface. The sensor interface may receive, from one or more sensors disposed on a CA/AD vehicle, sensor data indicative of friction between a road surface of a current location of the CA/AD vehicle and one or more surfaces of one or more tires of the CA/AD vehicle. The communication interface may receive, from an external road surface condition data source via a wireless technology, data indicative of friction for a surface of a road section ahead of the current location of the CA/AD vehicle. Furthermore, the driving strategy unit may determine, based at least in part on the sensor data and the data received from the external road surface condition data source, a driving strategy for the CA/AD vehicle beyond the current location of the CA/AD vehicle.

In embodiments, a method for CA/AD may be performed by a road surface condition data source. The method may include receiving, via a wireless technology, an indication of friction between a road surface of a first location where a first CA/AD vehicle is in and one or more surfaces of one or more tires of the first CA/AD vehicle. The method may include processing the received indication of the friction at the first location for the first CA/AD vehicle to generate an indication of a friction for a surface of the road section the first location is located. The method may further include communicating to a second CA/AD vehicle at a second location the generated indication of the friction for the surface of the road section, wherein the second location is separated from the road section by a distance along a road driving direction.

In embodiments, one or more non-transitory computer-readable media comprising instructions that cause a CA/AD system in a CA/AD vehicle, in response to execution of the instructions by the CA/AD system, to obtain, from one or more sensors disposed on the CA/AD vehicle, sensor data indicative of friction between a road surface of a current location of the CA/AD vehicle and one or more surfaces of one or more tires of the CA/AD vehicle. In addition, the instructions may cause the CA/AD system, in response to execution of the instructions by the CA/AD system, to obtain, from an external road surface condition data source via a wireless technology, data indicative of friction for a surface of a road section ahead of the current location of the CA/AD vehicle. Furthermore, the instructions may cause the CA/AD system, in response to execution of the instructions by the CA/AD system, to determine, based at least in part on the sensor data and the data received from the external road surface condition data source, a driving strategy for the CA/AD vehicle beyond the current location of the CA/AD vehicle.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

As used herein, the term semi-autonomous driving is synonymous with computer-assisted driving. The term does not mean exactly 50% of the driving functions are automated. The percentage of automated driving functions may vary between 0% and 100%. In addition, it will be appreciated that the hardware, circuitry and/or software implementing the semi-autonomous driving may temporarily provide no automation, or 100% automation, such as in response to an emergency situation.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "unit," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example environment 100 for a CA/AD vehicle 101 to communicate with an external road surface condition data source, e.g., a roadside unit (RSU) 103 or a cloud 105, for data indicative of friction for a surface of a road section 104 ahead of a current location 102 of the CA/AD vehicle 101, in accordance with various embodiments. For clarity, features of the environment 100, the CA/AD vehicle 101, the RSU 103, and the cloud 105 may be described below as an example for understanding an example environment for a CA/AD vehicle to communicate with an external road surface condition data source for data indicative of friction for a surface of a road section ahead of the current location. It is to be understood that there may be more or fewer components included in the environment 100, the CA/AD vehicle 101, the RSU 103, and the cloud 105. Further, it is to be understood that one or more of the devices and components within the environment 100, the CA/AD vehicle 101, the RSU 103, and the cloud 105 may include additional and/or varying features from the description below, and may include any devices and components that one having ordinary skill in the art would consider and/or refer to as the devices and components of an environment for a CA/AD vehicle to communicate with an external road surface condition data source for data indicative of friction for a surface of a road section ahead of the current location of the CA/AD vehicle.

In embodiments, the environment 100 may be a two dimensional (2D) freeway/highway/roadway environment. The environment 100 may include the CA/AD vehicle 101, the RSU 103, and the cloud 105. The cloud 105 may include a cloud server 151, which may be an application server. The RSU 103, the cloud 105, or the cloud server 151 may be referred to as an external road surface condition data source for the CA/AD vehicle 101. The communication between an external road surface condition data source, e.g., the RSU 103, the cloud 105, or the cloud server 151, and the CA/AD vehicle 101 may be a part of a vehicle-to-infrastructure (V2I) communications. In the description below, the RSU 103 may be used as an example of an external road surface condition data source. Operations performed by the RSU 103 may be similarly performed in the cloud 105, for example, by the cloud server 151, or any other external road surface condition data source.

In embodiments, the CA/AD vehicle 101 may communicate with an external road surface condition data source, e.g., the RSU 103, the cloud 105, or the cloud server 151, via a wireless technology 131. The wireless technology 131 may include a selected one of dedicated short range communications (DSRC) technology, Bluetooth technology, wireless fidelity (WiFi) technology, wireless local network (WLAN), cellular wireless network technology, short range radio technology, or any other wireless technology. In addition, the RSU 103 may communicate with the cloud 105 by a link 132, which may be a wireless or wired connection.

In embodiments, the road section 104 may be ahead of the current location 102 of the CA/AD vehicle 101, and separated by a distance 121. The distance 121 may be within a range of about 0.5 meter to about 1000 meters. There may be multiple CA/AD vehicles, e.g., a CA/AD vehicle 141, a CA/AD vehicle 143, or a CA/AD vehicle 145, in the road section 104. Hence, the CA/AD vehicle 141, the CA/AD vehicle 143, or the CA/AD vehicle 145 may be ahead of the current location 102 of the CA/AD vehicle 101 within a range of about 0.5 meter to about 1000 meters. In some other embodiments, the distance 121 may be larger than 1000 meters or shorter than 0.5 meter.

In embodiments, the CA/AD vehicle 101 may include one or more sensors, e.g., a sensor 111, one or more tires, e.g., a tire 113, and a vehicle onboard unit (OBU) 115 including a communication interface 117 to communicate with an external road surface condition data source, e.g., the RSU 103, the cloud 105, or the cloud server 151. The sensor 111 may generate sensor data, e.g., data 135, indicative of friction between a road surface of the current location 102 of the CA/AD vehicle 101 and a surface of the tire 113. In embodiments, there may be one or more surfaces of one or more tires for the CA/AD vehicle 101. The communication interface 117 may communicate the data 135 to an external road surface condition data source, e.g., the RSU 103 or the cloud 105.

In embodiments, an external road surface condition data source, e.g., the RSU 103 or the cloud 105, may communicate with the CA/AD vehicle 101, the CA/AD vehicle 141, the CA/AD vehicle 143, or the CA/AD vehicle 145 through the wireless technology 131. For example, the RSU 103 may receive data 135 from the CA/AD vehicle 101, data 142 from the CA/AD vehicle 141, data 144 from the CA/AD vehicle 143, and data 146 from the CA/AD vehicle 145. Data 142, data 144, and data 146 may be indicative of friction between a road surface of a current location of the CA/AD vehicle 141, the CA/AD vehicle 143, and the CA/AD vehicle 145, respectively, and one or more surfaces of one or more tires of the corresponding vehicle. Together, data 142, data 144, and data 146 may indicate friction of the road section 104 experienced by multiple vehicles, e.g., the CA/AD vehicle 141, the CA/AD vehicle 143, the CA/AD vehicle 145, reported to the external road surface condition data source, e.g., the RSU 103 or the cloud 105, over a period of time.

In some embodiments, an external road surface condition data source, e.g., the RSU 103 or the cloud 105, may process received data 142, data 144, and data 146 to generate data 133 indicative of friction for a surface of the road section 104 ahead of the current location 102 of the CA/AD vehicle 101. Data 133 may be calculated based on an average of data 142, data 144, and data 146 reported to the external road surface condition data source by the CA/AD vehicle 141, the CA/AD vehicle 143, the CA/AD vehicle 145, over a period of time. Additionally and alternatively, data 133 may be calculated as a weighted average, or some other statistics value based on data 142, data 144, and data 146. Individual data, e.g., data 142, data 144, and data 146 may represent frictions between individual locations experienced by a single vehicle, e.g., the CA/AD vehicle 141, the CA/AD vehicle 143, the CA/AD vehicle 145, within the road section 104. Data 133 generated based on data 142, data 144, and data 146 may be an indication of friction for a surface of the entire road section 104. In some embodiments, data 133 may include a collection of data about frictions experienced at multiple points of the entire road section 104, where the multiple points may be distributed across the entire road surface, across the entire width of multiple lanes of the road section 104. In some embodiments, data 133 may be generated based on data collected, e.g., data 142, data 144, and data 146, over a short period of time, e.g., within 5 minutes or 1 hour, when there is a large number of vehicles providing such data. In some other embodiments, there may not be enough vehicles to provide data to the external road surface condition data source, e.g., the RSU 103 or the cloud 105, and data 133 may be generate based on some historical data received over a long period of time, such as seasonal data for the road section 104 collected over a year ago or over the years.

In some embodiments, an external road surface condition data source, e.g., the RSU 103 or the cloud 105, may also generate a confidence level about the data 133, which may be an indication of the friction for the surface of the road section 104. The confidence level may depend on a number of data received by the external road surface condition data source, e.g., the RSU 103 or the cloud 105, and a length of the period of time the number of data received. The more data received over a shorter period of time, a higher confidence level may be generated for the data 133 as an indication of the friction for the surface of the road section 104. More details of the generation of the data 133 and the confidence level may be illustrated in FIG. 4 and FIG. 5.

In some embodiments, an external road surface condition data source, e.g., the RSU 103 or the cloud 105, may also generate a driving policy for the road section 104 based on data 133. For example, the RSU 103 may instruct the CA/AD vehicle 101 to adjust a position relative to a driving lane, a speed, an inter-vehicle distance of the CA/AD vehicle 101 with another vehicle, path choice within or across lanes, change a trajectory of the CA/AD vehicle 101. Such a driving policy may serve as a guideline for the CA/AD vehicle 101 when the CA/AD vehicle 101 may determine its driving strategy beyond the current location 102.

In some embodiments, the CA/AD vehicle 101 may be initially positioned around a center of a lane for better separation from surrounding vehicles. The RSU 103 may instruct the CA/AD vehicle 101 to adjust a position relative to a driving lane, to move to one side or another of the lane to increase the traction; make a sharper turn to load one side of the CA/AD vehicle 101 to increase traction on the outer side of the turn; use active suspension to tilt the CA/AD vehicle 101 in order to bias weight to one side of the CA/AD vehicle 101 that has access to better road condition; alter trajectory on uneven gravel road to eventually level the road surface; alter lane positions of the CA/AD vehicle 101 on a road with snow/ice/debris to help clear the road, instead of forming common ruts or tracks. The RSU 103 may instruct the CA/AD vehicle 101 to position itself relative to other vehicle categories. For example, a heavier vehicle may splash water off the road for following lighter vehicles that are more susceptible to hydroplaning. If the CA/AD vehicle 101 is a heavy vehicle, the RSU 103 may instruct the CA/AD vehicle 101 to take a lane so that any water splashed off may not affect other lighter vehicles.

In some embodiments, an external road surface condition data source, e.g., the RSU 103 or the cloud 105, may also generate a report about road conditions based on data 133, data 142, data 144, and data 146. For example, the RSU 103 may determine that the road surface of the road section 104 may be slippery since data 133 may indicate a small friction, and may notify an authority of maintenance conditions. The RSU 103 may notify such road conditions by sending data 137 to the cloud 105 over the link 132.

Furthermore, in embodiments, the RSU 103 may communicate data 133 to the CA/AD vehicle 101. The data 133 may be indicative of friction for a surface of a road section 104 ahead of the current location 102 of the CA/AD vehicle 101. In addition, the RSU 103 may also communicate to the CA/AD vehicle 101 a confidence level about data 133, or a driving policy for the CA/AD vehicle 101 beyond the current location 102. The RSU 103 may transmit data 133, a confidence level about the data 133, or a driving policy to the CA/AD vehicle 101 by broadcast.

In embodiments, the CA/AD vehicle 101 may be any type of vehicle, such as trucks, buses, motorcycles, boats or motorboats, and/or any other motorized devices. The CA/AD vehicle 101 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)).

In embodiments, the RSU 103 may be one or more hardware computer devices configured to provide wireless communication services to mobile devices (for example, OBU 115 in the CA/AD vehicle 101 or some other suitable device) within a coverage area or cell associated with the RSU 103. The RSU 103 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link. Furthermore, one or more network interface controllers may be configured to transmit/receive with various network elements (e.g., one or more servers within a core network, etc.) over another backhaul connection (not shown).

As an example, the RSU 103 may be a base station associated with a cellular network (e.g., an eNB in an LTE network, a gNB in a new radio access technology (NR) network, a WiMAX base station, etc.), a remote radio head, a relay radio device, a small cell base station (e.g., a femtocell, picocell, home evolved nodeB (HeNB), and the like), or other like network element. In addition, the RSU 103 may be a road embedded reflector, a smart street or traffic light, a road side tag, or a stationary user equipment (UE) type RSU.

In embodiments, the cloud 105 may represent the Internet, one or more cellular networks, a local area network (LAN) or a wide area network (WAN) including proprietary and/or enterprise networks, transfer control protocol (TCP)/internet protocol (IP)-based network, or combinations thereof. In such embodiments, the cloud 105 may be associated with network operator who owns or controls equipment and other elements necessary to provide network-related services, such as one or more base stations or access points (e.g., the RSU 103), one or more servers for routing digital data or telephone calls (for example, a core network or backbone network), etc. Implementations, components, and protocols used to communicate via such services may be those known in the art and are omitted herein for the sake of brevity.

In some embodiments, the cloud 105 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 105 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 105 and database systems) may coordinate the delivery of data to the OBU 115 of the CA/AD vehicle 101. Implementations, components, and protocols used to communicate via such services may be those known in the art and are omitted herein for the sake of brevity.

Figure 2:
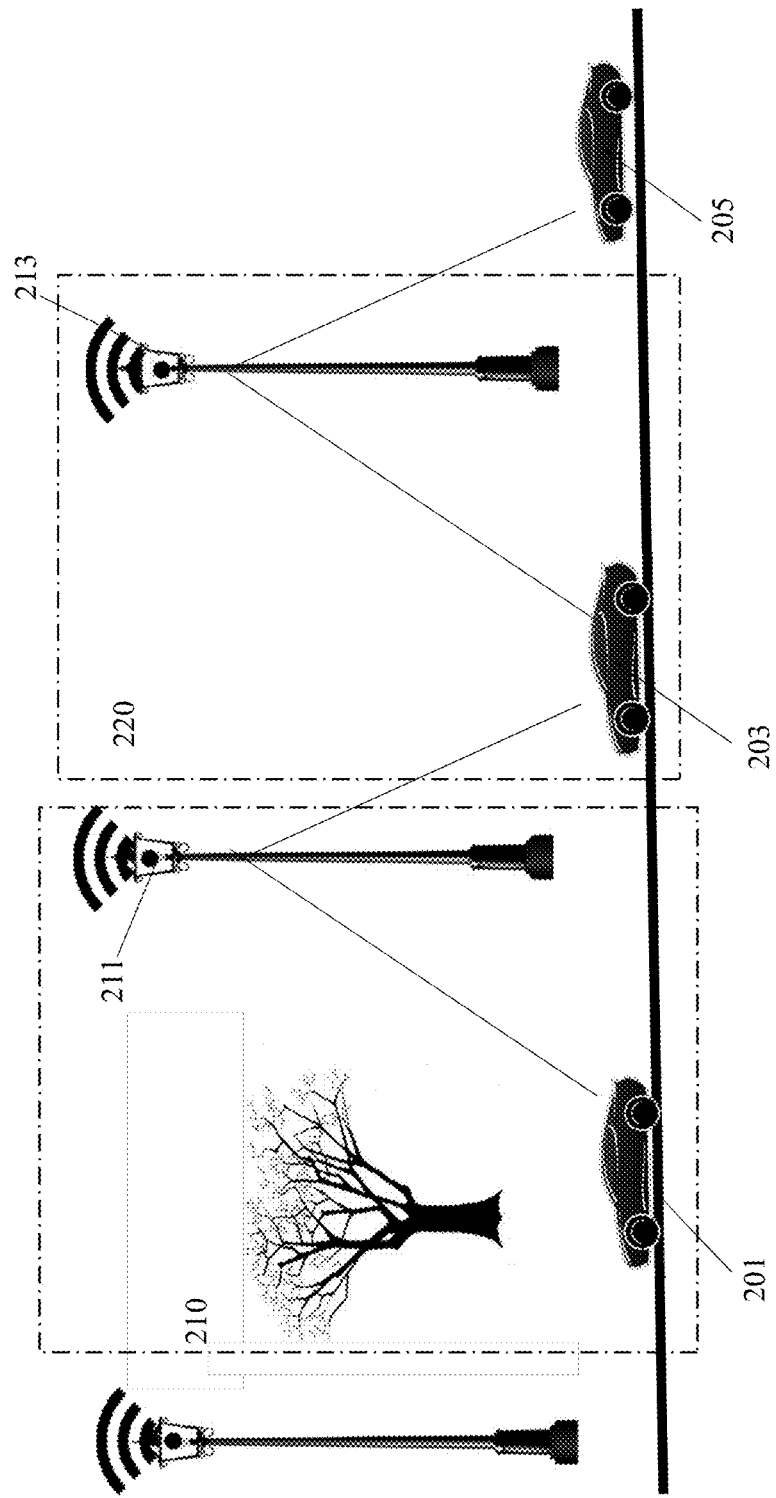
FIG. 2 illustrates multiple examples of a road section ahead of a CA/AD vehicle, where a different road section may have a different friction for a surface of the road section, in accordance with various embodiments.

FIG. 2 illustrates multiple examples of a road section ahead of a CA/AD vehicle, e.g., a road section 210 ahead of a CA/AD vehicle 203, a road section 220 ahead of a CA/AD vehicle 205, where a different road section may have a different friction for a surface of the road section, in accordance with various embodiments. In embodiments, the road section 210 may include a CA/AD vehicle 201, the road section 220 may include the CA/AD vehicle 203. The CA/AD vehicle 201 within the road section 210 ahead of the CA/AD vehicle 203 may be similar to the CA/AD vehicle 141 within the road section 104 ahead of the CA/AD vehicle 101. The CA/AD vehicle 203 within the road section 220 ahead of the CA/AD vehicle 205 may be similar to the CA/AD vehicle 141 within the road section 104 ahead of the CA/AD vehicle 101.

In embodiments, the CA/AD vehicle 201 may receive from one or more sensors disposed on the CA/AD vehicle 201, sensor data indicative of friction between a road surface of a current location of the CA/AD vehicle 201 and one or more surfaces of one or more tires of the CA/AD vehicle 201. The CA/AD vehicle 201 may communicate, to an external road surface condition data source 211, the sensor data. On the other hand, the external road surface condition data source 211 may process the received sensor data from the CA/AD vehicle 201 to generate an indication of a friction for a surface of the road section 210. For example, the external road surface condition data source 211 may detect the surface of the road section 210 may have a low friction, which may be caused by ice in shadow. The external road surface condition data source 211 may further communicate to the CA/AD vehicle 203 the indication of the friction for the surface of the road section 210. The CA/AD vehicle 203 may determine a driving strategy beyond its current location for an icy road condition for the road section 210.

Similarly, in embodiments, the CA/AD vehicle 203 may receive from one or more sensors disposed on the CA/AD vehicle 203, sensor data indicative of friction between a road surface of a current location of the CA/AD vehicle 203 and one or more surfaces of one or more tires of the CA/AD vehicle 203. The CA/AD vehicle 203 may communicate, to an external road surface condition data source 213, the sensor data. On the other hand, the external road surface condition data source 213 may process the received sensor data from the CA/AD vehicle 203 to generate an indication of a friction for a surface of the road section 220. For example, the external road surface condition data source 213 may detect the surface of the road section 220 may have a normal friction. The external road surface condition data source 213 may further communicate to the CA/AD vehicle 205 the indication of the friction for the surface of the road section 220. The CA/AD vehicle 205 may determine a driving strategy beyond its current location for a normal road condition for the road section 220.

Figure 3:
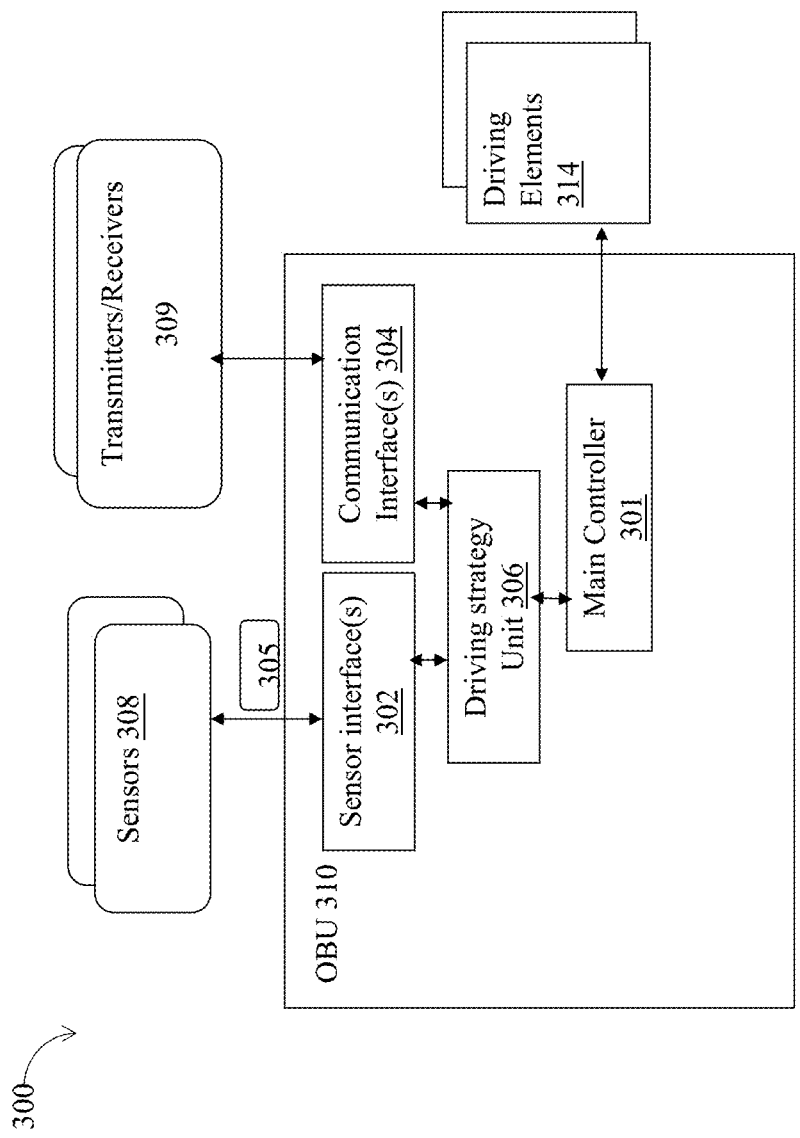
FIG. 3 illustrates an example CA/AD vehicle having a vehicle onboard unit (OBU) including a sensor interface, a communication interface to communicate with an external road surface condition data source, and a driving strategy unit, in accordance with various embodiments.

FIG. 3 illustrates an example CA/AD vehicle 300 having a vehicle onboard unit (OBU) 310 including a sensor interface 302, a communication interface 304 to communicate with an external road surface condition data source, and a driving strategy unit 306, in accordance with various embodiments. In embodiments, the CA/AD vehicle 300 and the OBU 310 may be an example to the CA/AD vehicle 101 and the OBU 115 shown in FIG. 1.

In embodiments, the CA/AD vehicle 300 may include the OBU 310, one or more sensors 308, one or more transmitters or receivers 309, and one or more driving elements 314. In detail, the OBU 310 may include the sensor interface 302, the communication interface 304, the driving strategy unit 306, and a main controller 301. The main controller 301 may coordinate or perform operations for the various components, e.g., the sensor interface 302, the communication interface 304, the driving strategy unit 306. The one or more sensors 308 may be an example of the sensor 111, and the one or more driving elements 314 may include a tire similar to the tire 113, as shown in FIG. 1. There may be other components, e.g., storage included in the OBU 310, not shown.

In embodiments, the sensors 308 may be operated continuously to collect sensor data 305 indicative of friction between a road surface of a current location of the CA/AD vehicle 300 and one or more surfaces of one or more tires of the CA/AD vehicle 300. The sensors 308 may include other kinds of sensors, e.g., camera, GPS, radar, LiDAR, and so forth.

In embodiments, the transmitters or receivers 309 may perform wireless communications with an external road surface condition data source, e.g., the RSU 103, the cloud 105, or the cloud server 151, as shown in FIG. 1. The transmitters or receivers 309 may be transmitters or receivers in a wireless technology, such as dedicated short range communications (DSRC) technology, Bluetooth technology, wireless fidelity (WiFi) technology, wireless local network (WLAN), cellular wireless network technology, short range radio technology, or any other wireless technology.

In embodiments, the OBU 310 may include the sensor interface 302, which may be used to receive from the sensors 308 the sensor data 305. There may be multiple such sensor data 305 from each individual sensor detecting a friction for a surface of a tire of the CA/AD vehicle 300.

In embodiments, the OBU 310 may include the communication interface 304 to receive, from an external road surface condition data source, e.g., the RSU 103, the cloud 105, or the cloud server 151, as shown in FIG. 1, data indicative of friction for a surface of a road section ahead of the current location of the CA/AD vehicle 300. In addition, the communication interface 304 may receive a confidence level about the data indicative of the friction for the surface of the road section ahead of the current location of the CA/AD vehicle, a driving policy for the CA/AD vehicle 300 beyond the current location, or other system data.

For example, the communication interface 304 may receive various data packets and/or data streams, navigation signaling/data (e.g., global navigation satellite system (GNSS), global positioning system (GPS), etc.), and/or the like. In embodiments, the communication interface 304 may also include, or operate in conjunction with communications circuitry and/or input/output (I/O) interface circuitry in order to obtain the data for the various sources. For example, the communication interface 304 may include an interface an input/output (I/O) or bus interface, such as a $I^2$ bus, an Integrated Drive Electronic (IDE) bus, a Serial Advanced Technology Attachment (SATA) bus, a Peripheral Component Interconnect (PCI) bus, a Universal Serial Bus (USB), a Near Field Communication (NFC) interface, a Bluetooth® interface, WiFi, and so forth.

In embodiments, the OBU 310 may include the driving strategy unit 306 coupled to the sensor interface 302 and the communication interface 304 to determine, based at least in part on the sensor data and the data received from the external road surface condition data source, a driving strategy for the CA/AD vehicle 300 beyond the current location of the CA/AD vehicle. In addition, the driving strategy unit 306 may determine a driving strategy based on a confidence level about the data indicative of the friction for the surface of the road section ahead of the current location of the CA/AD vehicle 300, or a driving policy received.

For example, the driving strategy unit 306 may determine an adjustment of a position of the CA/AD vehicle 300 relative to a driving lane, an adjustment of a speed of the CA/AD vehicle 300, an adjustment of an inter-vehicle distance of the CA/AD vehicle 300 with another vehicle, or an alteration of a trajectory of the CA/AD vehicle 300.

In embodiments, the driving strategy unit 306 may determine that performance of the driving strategy by the CA/AD vehicle 300 is to commence immediately, beginning from the current location. Additionally and alternatively, the driving strategy unit 306 may determine that commencement of performance of the driving strategy by the CA/AD vehicle 300 is to be delayed until the CA/AD vehicle 300 is at less than a distance before the road section ahead of the current location of the CA/AD vehicle 300. Furthermore, the driving strategy unit 306 may determine that performance of the driving strategy by the CA/AD vehicle 300 is to commence when the CA/AD vehicle 300 is on the road section ahead of the current location of the CA/AD vehicle 300.

In embodiments, the driving strategy unit 306 may determine whether an abnormal condition of the CA/AD vehicle 300 has occurred, based at least in part on the sensor data and the data received from the external road surface condition data source. For example, the sensor data 305 may indicate a low friction between a road surface of a current location of the CA/AD vehicle 300 and one or more surfaces of one or more tires of the CA/AD vehicle 300. On the other hand, the data received from the external road surface condition data source may indicate the friction for the road surface at the road section may be normal. In such a case, the driving strategy unit 306 may determine there may be an abnormal condition for one or more tires of the CA/AD vehicle occurred. For example, one or more tires may have an incorrect inflation level. As a result, the driving strategy unit 306 may determine to adjust an inflation level of the one or more tires.

In embodiments, the OBU 310 may be any type of computer device that is mounted on, built into, or otherwise embedded in a vehicle and is capable of performing operations. In some embodiments, the OBU 310 may be a computer device used to control one or more systems of the CA/AD vehicle 300, such as an ECU, ECM, embedded system, microcontroller, control module, EMS, OBD devices, DME, MDTs, etc. The OBU 310 may include one or more processors (having one or more processor cores and optionally, one or more hardware accelerators), memory devices, communication devices, etc. that may be configured to carry out various functions according to the various embodiments discussed here. For example, the OBU 310 may be the computer device 600 shown in FIG. 6, and may execute instructions stored in a computer-readable medium, e.g., the computer-readable medium 702 as shown in FIG. 7, or may be pre-configured with the logic (e.g., with appropriate bit streams, logic blocks, etc.).

In embodiments, the OBU 310, including the main controller 301, may be implemented in hardware, e.g., ASIC, or programmable combinational logic circuit (e.g., (FPGA)), or software (to be executed by a processor and memory arrangement), or combination thereof. For software implementations, in some embodiments, the OBU 310 may perform functions operated by the main controller 301.

Figure 4:
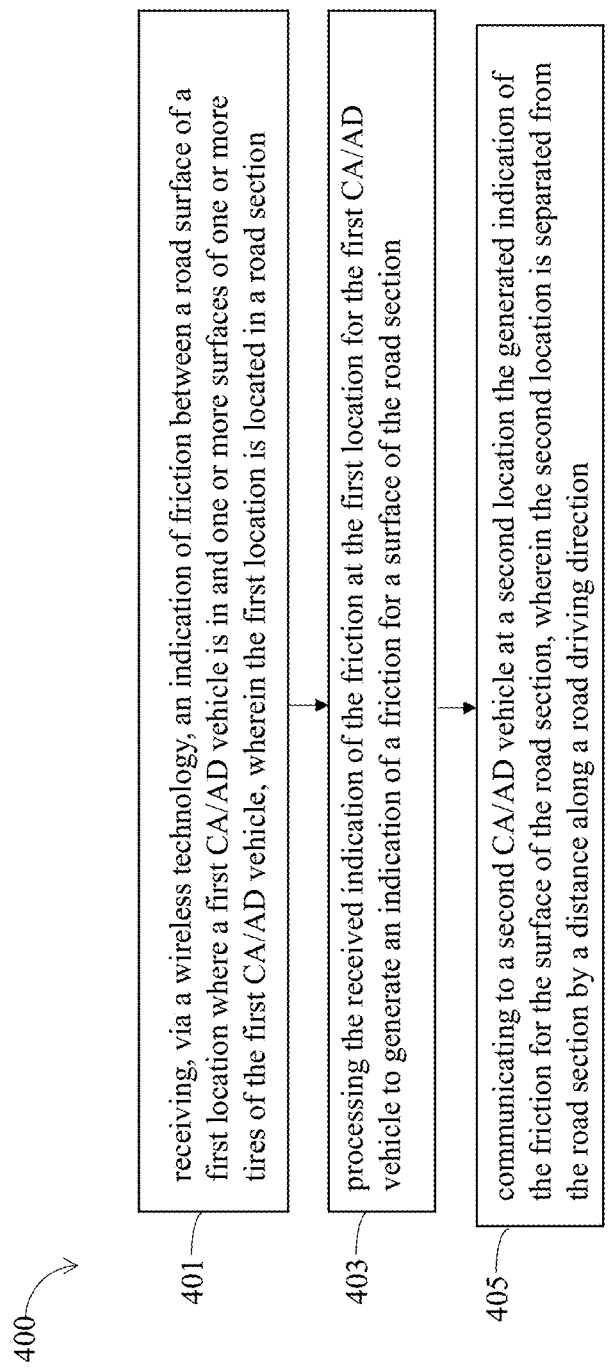
FIG. 4 illustrates an example process for CA/AD driving, performed by an external road surface condition data source, in accordance with various embodiments.

FIG. 4 illustrates an example process 400 for CA/AD driving, performed by an external road surface condition data source, in accordance with various embodiments. In embodiments, the process 400 may be a process performed by an external road surface condition data source, e.g., the RSU 103, the cloud 105, or the cloud server 151, as shown in FIG. 1.

The process 400 may start at an interaction 401. During the interaction 401, an indication of friction between a road surface of a first location where a first CA/AD vehicle is in and one or more surfaces of one or more tires of the first CA/AD vehicle may be received, where the first location may be located in a road section. For example, at the interaction 401, data 142 may be received as an indication of friction between a road surface of a first location where the vehicle 141 is in and one or more surfaces of one or more tires of the CA/AD vehicle 141, where the CA/AD vehicle 141 may be located in the road section 104.

During an interaction 403, the received indication of the friction at the first location for the first CA/AD vehicle may be processed to generate an indication of a friction for a surface of the road section. For example, at the interaction 403, the received data 142 may be processed to generate data 133 as an indication of a friction for a surface of the road section 104. When data 142 is received, it represents friction at one location of the road section 104. After the processing, data 133 is generated as an indication of a friction for a surface of the road section 104, instead of one location.

During an interaction 405, the generated indication of the friction for the surface of the road section may be communicated to a second CA/AD vehicle at a second location, where the second location is separated from the road section by a distance along a road driving direction. For example, at the interaction 405, data 133, which may be the generated indication of the friction for the surface of the road section 104, may be communicated to the CA/AD vehicle 101 at a second location, where the CA/AD vehicle 101 may be separated from the road section 104 by the distance 121.

Figure 5:
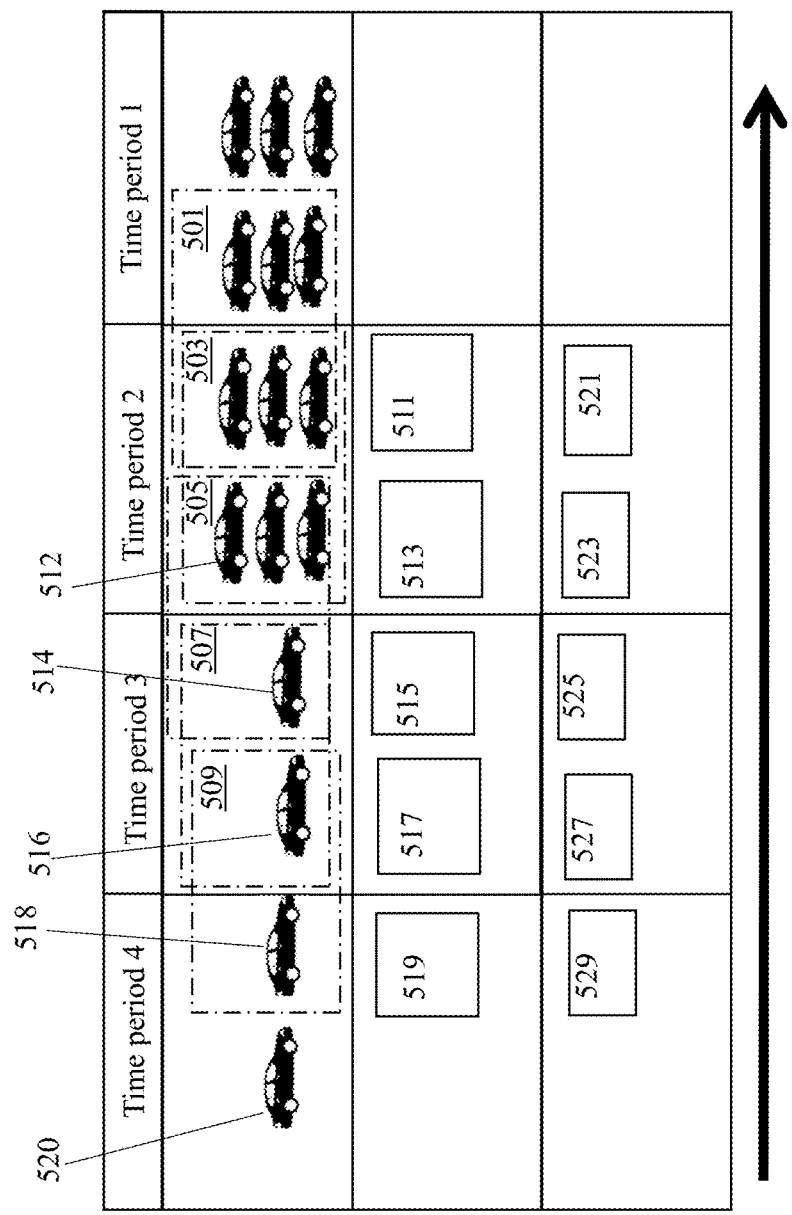
FIG. 5 illustrates example data indicative of friction for a surface of a road section generated by an external road surface condition data source, in accordance with various embodiments.

FIG. 5 illustrates example data, e.g., data 511, data 513, data 515, data 517, and data 519, indicative of friction for a surface of a road section, generated by an external road surface condition data source, in accordance with various embodiments. In embodiments, data 511, data 513, data 515, data 517, and data 519 may be similar to data 133 generated by an external road surface condition data source, e.g., the RSU 103 or the cloud 105, and communicated to the CA/AD vehicle 101. Data 133 may be indicative of friction for a surface of a road section, e.g., the road section 104, ahead of the current location 102 of the CA/AD vehicle 101.

In embodiments, at time period 1, there may be six CA/AD vehicles going through the road section 104. At time period 2, there may be six CA/AD vehicles, including a CA/AD vehicle 512, going through the road section 104. At time period 3, there may be two CA/AD vehicles, a CA/AD vehicle 514 and a CA/AD vehicle 516, going through the road section 104. At time period 4, there may be two CA/AD vehicles, a CA/AD vehicle 518 and a CA/AD vehicle 520, going through the road section 104. Each CA/AD vehicle may report sensor data indicative of friction between a road surface of a current location of the CA/AD vehicle and one or more surfaces of one or more tires of the CA/AD vehicle to an external road surface condition data source, e.g., the RSU 103 or the cloud 105.

In embodiments, before entering the road section 104 at time period 2, the CA/AD vehicle 512 may receive data 511 from an external road surface condition data source, e.g., the RSU 103 or the cloud 105. Data 511 may be calculated by the external road surface condition data source, e.g., the RSU 103, based on sensor data received from six vehicles driving through the road section 104 within a time window 501. Data 511 may have a confidence level 521, which may be high.

Similarly, before entering the road section 104 at time period 3, the vehicle 514 may receive data 513 from an external road surface condition data source, e.g., the RSU 103 or the cloud 105. Data 513 may be calculated by the external road surface condition data source, e.g., the RSU 103 or the cloud 105, based on sensor data received from six vehicles driving through the road section 104 within a time window 503. Data 513 may have a confidence level 523, which may be high.

In addition, before entering the road section 104 at time period 3, the vehicle 516 may receive data 515 from an external road surface condition data source, e.g., the RSU 103 or the cloud 105. Data 515 may be calculated by the external road surface condition data source, e.g., the RSU 103 or the cloud 105, based on sensor data received from four vehicles driving through the road section 104 within a time window 505. Data 515 may have a confidence level 525, which may be medium. The confidence level 525 may be medium, instead of being high as the confidence level 523, because data 515 may be calculated based on a smaller number of data received by the external road surface condition data source during the time window 505. In some embodiments, the external road surface condition data source, e.g., the RSU 103 or the cloud 105, may use some historical data in the calculation of data 515. Accordingly, the confidence level 525 may be reduced from being high to be medium.

Furthermore, before entering the road section 104 at time period 4, the vehicle 518 may receive data 517 from an external road surface condition data source, e.g., the RSU 103 or the cloud 105. Data 517 may be calculated by the external road surface condition data source, e.g., the RSU 103 or the cloud 105, based on sensor data received from two vehicles driving through the road section 104 within a time window 507. Data 517 may have a confidence level 527, which may be low. The confidence level 517 may be low, instead of high for the confidence level 523, or medium for the confidence level 525, because data 517 may be calculated based on an even smaller number, e.g., two, of data received by the external road surface condition data source within the time window 507. In some embodiments, the external road surface condition data source, e.g., the RSU 103 may use some historical data in the calculation of data 517. Accordingly, the confidence level 527 may be reduced from medium to be low.

Similarly, before entering the road section 104 at time period 4, the vehicle 520 may receive data 519 from an external road surface condition data source, e.g., the RSU 103 or the cloud 105. Data 519 may be calculated by the external road surface condition data source, e.g., the RSU 103 or the cloud 105, based on sensor data received from two vehicles driving through the road section 104 within a time window 509. Data 519 may have a confidence level 529, which may be low, which may be similar to the confidence level 527.

Figure 6:
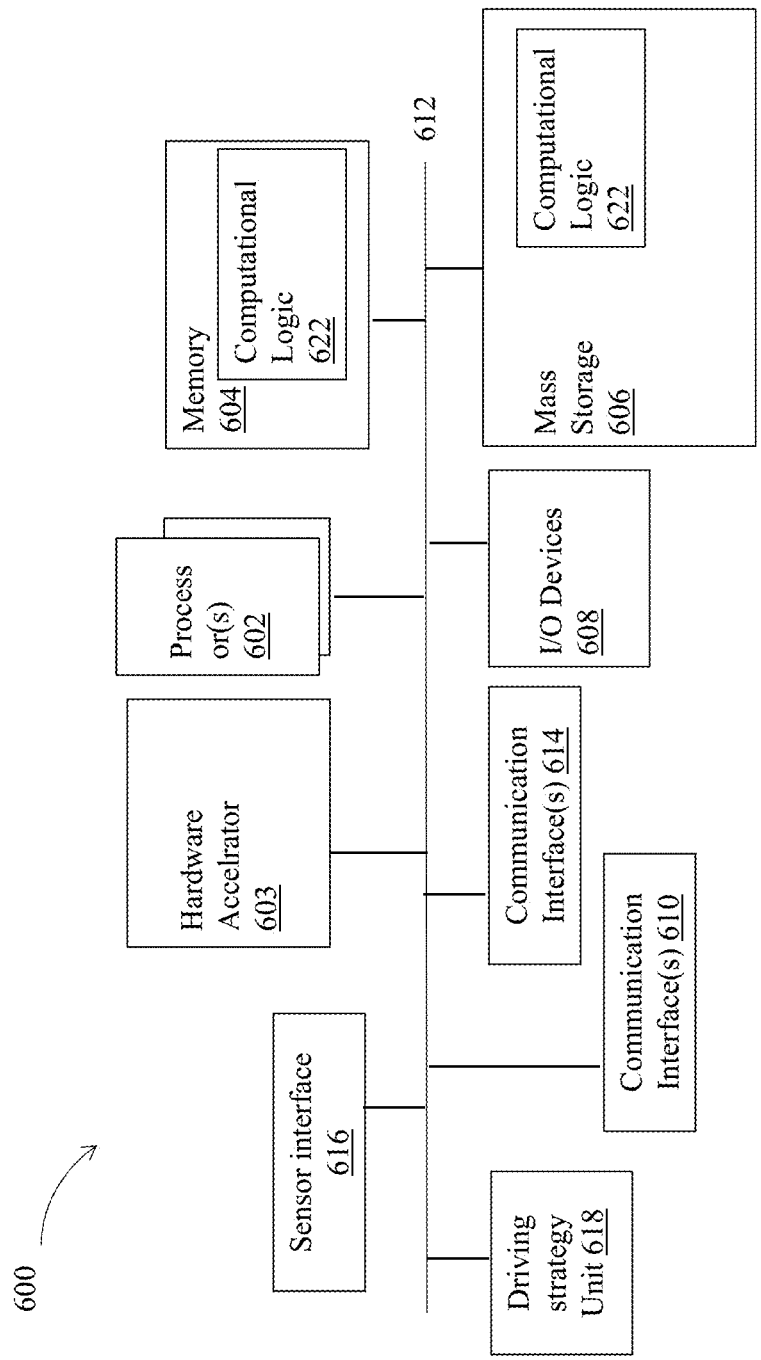
FIG. 6 illustrates an example computer device suitable for use to practice various aspects of the present disclosure, in accordance with various embodiments.
Figure 7:
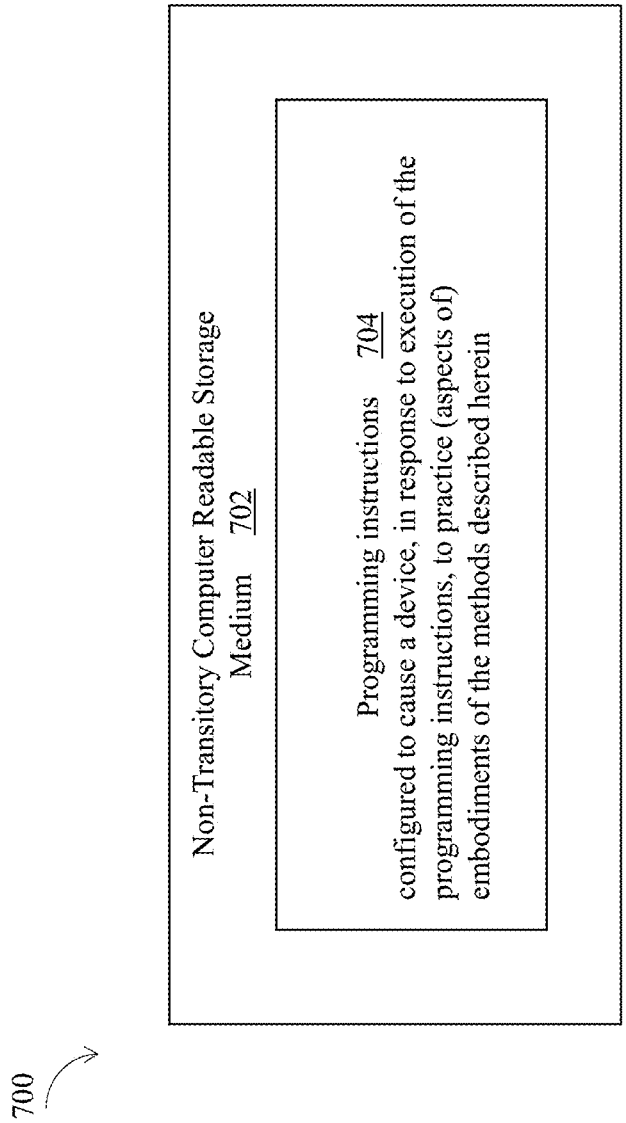
FIG. 7 illustrates a storage medium having instructions for practicing methods described with references to FIGS. 1-6, in accordance with various embodiments.

FIG. 6 illustrates an example computer device 600 that may be suitable as a device to practice selected aspects of the present disclosure. The device 600 may be an example of the OBU 115, or the OBU 310, or a computer device to implement the process 400 for an external road surface condition data source, as shown in FIG. 1, FIG. 3, or FIG. 4. As shown, the device 600 may include one or more processors 602, each having one or more processor cores, or and optionally, a hardware accelerator 603 (which may be an ASIC or a FPGA). In alternate embodiments, the hardware accelerator 603 may be part of processor 602, or integrated together on a SOC. Additionally, the device 600 may include a memory 604, which may be any one of a number of known persistent storage medium, and mass storage 606. In addition, the 600 may include input/output devices 608. Furthermore, the device 600 may include communication interfaces 610 and 614, a sensor interface 616, and a driving strategy unit 618, which may be an example of the communication interface 304, the sensor interface 302, and the driving strategy unit 306, as shown in FIG. 3. The elements may be coupled to each other via system bus 612, which may represent one or more buses. In the case of multiple buses, they may be bridged by one or more bus bridges (not shown).

Each of these elements may perform its conventional functions known in the art. In particular, the memory 604 and/or the mass storage 606 may store and host execution of programming instructions implementing the operations associated with road surface friction based predictive driving for CA/AD vehicles to be performed by an apparatus for CA/AD, as described in connection with FIGS. 1-5, and/or other functions, collectively referred to as computational logic 622 that provides the capability of the embodiments described in the current disclosure.

The various elements may be implemented by assembler instructions supported by processor(s) 602 or high-level languages, such as, for example, C, that can be compiled into such instructions. Operations associated with safety operations and configuration of safety operations not implemented in software may be implemented in hardware, e.g., via hardware accelerator 603.

The number, capability and/or capacity of these elements 601-622 may vary, depending on the number of other devices the device 600 is configured to support. Otherwise, the constitutions of elements 601-622 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., device 700 employed as an OBU or a RSU/cloud server, in response to execution of the programming instructions, to perform, e.g., various corresponding operations in a CA/AD vehicle or a RSU/cloud server, associated with road surface friction based predictive driving for CA/AD vehicles, as shown in FIGS. 1-5.

In alternate embodiments, programming instructions 704 may be disposed on multiple computer-readable non-transitory storage media 702 instead. In alternate embodiments, programming instructions 704 may be disposed on computer-readable transitory storage media 702, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for computer assisted or autonomous driving (CA/AD), comprising: a sensor interface to receive, from one or more sensors disposed on a CA/AD vehicle, sensor data indicative of friction between a road surface of a current location of the CA/AD vehicle and one or more surfaces of one or more tires of the CA/AD vehicle; a communication interface to receive, from an external road surface condition data source via a wireless technology, data indicative of friction for a surface of a road section ahead of the current location of the CA/AD vehicle; and a driving strategy unit coupled to the sensor interface and the communication interface to determine, based at least in part on the sensor data and the data received from the external road surface condition data source, a driving strategy for the CA/AD vehicle beyond the current location of the CA/AD vehicle.

Example 2 may include the apparatus of example 1 and/or some other examples herein, wherein the data indicative of the friction for the surface of the road section ahead of the vehicle is based on friction of the road section experienced by multiple other vehicles, reported to the external road surface condition data source over a period of time.

Example 3 may include the apparatus of example 2 and/or some other examples herein, wherein the data indicative of the friction for the surface of the road section ahead of the vehicle is based on an average of the friction of the road section experienced by multiple other vehicles, reported to the external road surface condition data source over the period of time.

Example 4 may include the apparatus of example 1 and/or some other examples herein, wherein to determine the driving strategy, the driving strategy unit is to determine: an adjustment of a position of the CA/AD vehicle relative to a driving lane; an adjustment of a speed of the CA/AD vehicle; an adjustment of an inter-vehicle distance of the CA/AD vehicle with another vehicle; an adjustment of a position with a lane or across lanes for the CA/AD vehicle; an adjustment of a choice of a lane among multiple lanes for the CA/AD vehicle; an adjustment of a degree of a turn to make for the CA/AD vehicle; an adjustment of an active suspension to tilt the CA/AD vehicle; or an alteration of a trajectory of the CA/AD vehicle.

Example 5 may include the apparatus of any one of examples 1~4 and/or some other examples herein, wherein performance of the driving strategy by the CA/AD vehicle is to commence immediately, beginning from the current location.

Example 6 may include the apparatus of any one of examples 1~4 and/or some other examples herein, wherein commencement of performance of the driving strategy by the CA/AD vehicle is to be delayed until the CA/AD vehicle is at less than a distance before the road section ahead of the current location of the CA/AD vehicle.

Example 7 may include the apparatus of any one of examples 1~4 and/or some other examples herein, wherein performance of the driving strategy by the CA/AD vehicle is to commence when the CA/AD vehicle is on the road section ahead of the current location of the CA/AD vehicle.

Example 8 may include the apparatus of any one of examples 1~4 and/or some other examples herein, wherein the wireless technology includes a selected one of dedicated short range communications (DSRC) technology, Bluetooth technology, wireless fidelity (WiFi) technology, wireless local network (WLAN), cellular wireless network technology, or short range radio technology.

Example 9 may include the apparatus of any one of examples 1~4 and/or some other examples herein, wherein the communication interface is to receive the data indicative of the friction for the surface of the road section ahead of the current location of the CA/AD vehicle from a roadside unit (RSU) via broadcast.

Example 10 may include the apparatus of example 9 and/or some other examples herein, wherein the RSU is a selected one of a road embedded reflector, a smart street or traffic light, a road side tag, an evolved node B (eNB) type RSU, or a stationary user equipment (UE) type RSU.

Example 11 may include the apparatus of any one of examples 1~4 and/or some other examples herein, wherein the communication interface is to receive the data indicative of the friction for the surface of the road section ahead of the current location of the CA/AD vehicle from an application server or a cloud server.

Example 12 may include the apparatus of any one of examples 1~4 and/or some other examples herein, wherein the road section ahead of the current location of the CA/AD vehicle is within a range of about 0.5 meter to about 1000 meters ahead of the current location of the CA/AD vehicle.

Example 13 may include the apparatus of any one of examples 1~4 and/or some other examples herein, wherein the communication interface is further to receive a confidence level about the data indicative of the friction for the surface of the road section ahead of the current location of the CA/AD vehicle, and the driving strategy unit is to further determine the driving strategy for the CA/AD vehicle beyond the current location, based on the confidence level.

Example 14 may include the apparatus of any one of examples 1~4 and/or some other examples herein, wherein the communication interface is further to receive a driving policy for the CA/AD vehicle beyond the current location, and the driving strategy unit is to further determine the driving strategy, based on the received driving policy.

Example 15 may include the apparatus of any one of examples 1~4 and/or some other examples herein, wherein to determine the driving strategy, the driving strategy unit is to determine whether an abnormal condition of the CA/AD vehicle occurred, based at least in part on the sensor data and the data received from the external road surface condition data source.

Example 16 may include the apparatus of any one of examples 1~4 and/or some other examples herein, wherein the communication interface is further to communicate, to the external road surface condition data source, the sensor data.

Example 17 may include the apparatus of any one of examples 1~4 and/or some other examples herein, wherein the apparatus is a vehicle onboard unit (OBU) disposed in the CA/AD vehicle.

Example 18 may include the apparatus of any one of examples 1~4 and/or some other examples herein, wherein the apparatus is the CA/AD vehicle comprising the one or more tires, the one or more sensors, and a vehicle onboard unit (OBU) having the sensor interface, the communication interface, and the driving strategy unit.

Example 19 may include a method for computer assisted or autonomous driving (CA/AD), performed by a road surface condition data source, comprising: receiving, via a wireless technology, an indication of friction between a road surface of a first location where a first CA/AD vehicle is in and one or more surfaces of one or more tires of the first CA/AD vehicle, wherein the first location is located in a road section; processing the received indication of the friction at the first location for the first CA/AD vehicle to generate an indication of a friction for a surface of the road section; and communicating to a second CA/AD vehicle at a second location the generated indication of the friction for the surface of the road section, wherein the second location is separated from the road section by a distance along a road driving direction.

Example 20 may include the method of example 19 and/or some other examples herein, further comprising: generating a confidence level about the indication of the friction for the surface of the road section; and communicating to the second vehicle the generated confidence level.

Example 21 may include the method of any one of examples 19-20 and/or some other examples herein, further comprising: generating a driving policy for the road section based on the indication of the friction for the surface of the road section; and communicating to the second vehicle the driving policy.

Example 22 may include the method of any one of examples 19-20 and/or some other examples herein, further comprising: notifying an authority of maintenance conditions based on the indication of the friction for the surface of the road section.

Example 23 may include the method of any one of examples 19-20 and/or some other examples herein, further comprising: receiving an indication of a friction between a road surface of the second location where the second vehicle is in and one or more surfaces of one or more tires of the second CA/AD vehicle.

Example 24 may include one or more non-transitory computer-readable media comprising instructions that cause a computer assisted or autonomous driving (CA/AD) system in a CA/AD vehicle, in response to execution of the instructions by the CA/AD system, to: obtain, from one or more sensors disposed on the CA/AD vehicle, sensor data indicative of friction between a road surface of a current location of the CA/AD vehicle and one or more surfaces of one or more tires of the CA/AD vehicle; obtain, from an external road surface condition data source via a wireless technology, data indicative of friction for a surface of a road section ahead of the current location of the CA/AD vehicle; and determine, based at least in part on the sensor data and the data received from the external road surface condition data source, a driving strategy for the CA/AD vehicle beyond the current location of the CA/AD vehicle.

Example 25 may include the one or more non-transitory computer-readable media of example 24, wherein the data indicative of the friction for the surface of the road section ahead of the vehicle is based on friction of the road section experienced by multiple other vehicles, reported to the external road surface condition data source over a period of time.

Example 26 may include an apparatus for computer assisted or autonomous driving (CA/AD), comprising: means for receiving, via a wireless technology, an indication of friction between a road surface of a first location where a first CA/AD vehicle is in and one or more surfaces of one or more tires of the first CA/AD vehicle, wherein the first location is located in a road section; means for processing the received indication of the friction at the first location for the first CA/AD vehicle to generate an indication of a friction for a surface of the road section; and means for communicating to a second CA/AD vehicle at a second location the generated indication of the friction for the surface of the road section, wherein the second location is separated from the road section by a distance along a road driving direction.

Example 27 may include the apparatus of example 26 and/or some other examples herein, further comprising: means for generating a confidence level about the indication of the friction for the surface of the road section; and means for communicating to the second vehicle the generated confidence level.

Example 28 may include the apparatus of any one of examples 26-27 and/or some other examples herein, further comprising: means for generating a driving policy for the road section based on the indication of the friction for the surface of the road section; and means for communicating to the second vehicle the driving policy.

Example 29 may include the apparatus of any one of examples 26-27 and/or some other examples herein, further comprising: means for notifying an authority of maintenance conditions based on the indication of the friction for the surface of the road section.

Example 30 may include the apparatus of any one of examples 26-27 and/or some other examples herein, further comprising: means for receiving an indication of a friction between a road surface of the second location where the second vehicle is in and one or more surfaces of one or more tires of the second CA/AD vehicle.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. An apparatus for computer assisted or autonomous driving, comprising:
    a sensor interface to receive, from one or more sensors disposed at a vehicle, vehicle data indicative of friction between a road surface of a current location of the vehicle and one or more surfaces of one or more wheels of the vehicle;
    a communication interface to receive, from an external data source via a wireless technology, data indicating friction of a surface of a road section ahead of the current location of the vehicle; and
    a driving strategy determiner coupled to the sensor interface and the communication interface, the driving strategy determiner to:
        determine, based at least in part on the vehicle data and the data received from the external data source, a driving strategy for autonomous or semi-autonomous control of the vehicle, wherein the driving strategy includes an adjustment of a speed of the vehicle, and
        autonomously implement the determined driving strategy from the current location to the road section ahead of the current location.

2. The apparatus of claim 1, wherein the driving strategy further includes performance of one or more vehicle movements.

3. The apparatus of claim 2, wherein the one or more vehicle movements include one or more of:
    an adjustment of a position of the vehicle relative to a driving lane;
    an adjustment of a position of the vehicle within a driving lane;
    an adjustment of a position of the vehicle across multiple driving lanes;
    an adjustment of a choice of a lane among multiple lanes for the vehicle;
    an adjustment of a degree of a turn to make for the vehicle; and
    an adjustment of an active suspension to tilt the vehicle.

4. The apparatus of claim 1, wherein the driving strategy further includes an adjustment of an inter-vehicle distance of the vehicle with another vehicle.

5. The apparatus of claim 1, wherein the driving strategy further includes an alteration of a trajectory of the vehicle.

6. The apparatus of claim 1, wherein the data indicating the friction of the surface of the road section ahead of the vehicle is based on friction data for the road section experienced by one or more other vehicles reported to the external data source.

7. The apparatus of claim 1, wherein the communication interface is further to communicate, to the external data source, the vehicle data.

8. The apparatus of claim 1, wherein the external data source is a cloud computing service.

9. The apparatus of claim 1, wherein the driving strategy determiner is further to:

autonomously implement the determined driving strategy from the current location through the road section ahead of the current location.

10. The apparatus of claim 1, wherein the driving strategy determiner is further to:
autonomously implement the determined driving strategy from the current location to the road section ahead of the current location and through a location between the current location and the road section ahead of the current location.

11. The apparatus of claim 1, wherein the driving strategy determiner is further to:
autonomously implement the determined driving strategy from the current location to the road section ahead of the current location in a manner that attempts to avoid abrupt driving strategy changes.

12. One or more non-transitory computer-readable media (NTCRM) comprising instructions for computer assisted or autonomous driving, wherein execution of the instructions by one or more processors of a computer system is to cause the computer system to:
receive, from one or more vehicle sensors, vehicle data indicating friction between a road surface of a current location of a vehicle and one or more surfaces of one or more wheels of the vehicle;
receive, from an external data source via a wireless technology, data indicating friction of a surface of a road section ahead of the current location of the vehicle;
determine, based at least in part on the vehicle data and the data received from the external data source, a driving strategy for autonomous or semi-autonomous control of the vehicle, wherein the driving strategy includes an adjustment of a speed of the vehicle; and
autonomously implement the determined driving strategy from the current location to the road section ahead of the current location.

13. The one or more NTCRM of claim 12, wherein the driving strategy further includes performance of one or more vehicle movements.

14. The one or more NTCRM of claim 13, wherein the one or more vehicle movements include one or more of:
an adjustment of a position of the vehicle relative to a driving lane;
an adjustment of a position of the vehicle within a driving lane;
an adjustment of a position of the vehicle across multiple driving lanes;
an adjustment of a choice of a lane among multiple lanes for the vehicle;
an adjustment of a degree of a turn to make for the vehicle; and
an adjustment of an active suspension to tilt the vehicle.

15. The one or more NTCRM of claim 12, wherein the driving strategy further includes one or more of:
an adjustment of an inter-vehicle distance of the vehicle with another vehicle; and
an alteration of a trajectory of the vehicle.

16. The one or more NTCRM of claim 12, wherein the data indicating the friction of the surface of the road section ahead of the vehicle is based on friction data for the road section experienced by one or more other vehicles reported to the external data source.

17. The one or more NTCRM of claim 12, wherein execution of the instructions is to further cause the computer system to:
send the vehicle data to the external data source.

18. The one or more NTCRM of claim 12, wherein the external data source is a cloud computing service.

19. The one or more NTCRM of claim 12, wherein execution of the instructions is to further cause the computer system to:
autonomously implement the determined driving strategy from the current location through the road section ahead of the current location.

20. The one or more NTCRM of claim 12, wherein execution of the instructions is to further cause the computer system to:
autonomously implement the determined driving strategy from the current location to the road section ahead of the current location and through a location between the current location and the road section ahead of the current location.

21. The one or more NTCRM of claim 12, wherein execution of the instructions is to further cause the computer system to:
autonomously implement the determined driving strategy from the current location to the road section ahead of the current location in a manner that attempts to avoid abrupt driving strategy changes.

22. A method for computer assisted or autonomous driving, the method comprising:
receiving, by a computing system from one or more vehicle sensors, vehicle data indicating friction between a road surface of a current location of a vehicle and one or more surfaces of one or more wheels of the vehicle;
receive, by the computing system from an external data source via a wireless technology, data indicating friction of a surface of a road section ahead of the current location of the vehicle;
determine, by the computing system based at least in part on the vehicle data and the data received from the external data source, a driving strategy for autonomous or semi-autonomous control of the vehicle, wherein the driving strategy includes an adjustment of a speed of the vehicle; and
autonomously implement, by the computing system, the determined driving strategy from the current location to the road section ahead of the current location.

23. The method of claim 22, wherein the driving strategy further includes performance of one or more vehicle movements.

24. The method of claim 23, wherein the one or more vehicle movements include one or more of:
an adjustment of a position of the vehicle relative to a driving lane;
an adjustment of a position of the vehicle within a driving lane;
an adjustment of a position of the vehicle across multiple driving lanes;
an adjustment of a choice of a lane among multiple lanes for the vehicle;
an adjustment of a degree of a turn to make for the vehicle; and
an adjustment of an active suspension to tilt the vehicle.

25. The method of claim 22, wherein the driving strategy further includes one or more of an adjustment of an inter-vehicle distance of the vehicle with another vehicle, and an alteration of a trajectory of the vehicle.

26. The method of claim 22, wherein the data indicating the friction of the surface of the road section ahead of the vehicle is based on friction data for the road section experienced by one or more other vehicles reported to the external data source.

27. The method of claim 22, further comprising: sending the vehicle data to the external data source.

28. The method of claim 27, wherein the external data source is a cloud computing service.

29. The method of claim 22, further comprising: autonomously implementing the determined driving strategy from the current location through the road section ahead of the current location.

30. The method of claim 22, further comprising: autonomously implementing the determined driving strategy from the current location to the road section ahead of the current location and through a location between the current location and the road section ahead of the current location.

31. The method of claim 22, further comprising: autonomously implementing the determined driving strategy from the current location to the road section ahead of the current location in a manner that attempts to avoid abrupt driving strategy changes.

\* \* \* \* \*